United States Patent
Ota

(10) Patent No.: US 7,972,237 B2
(45) Date of Patent: Jul. 5, 2011

(54) GEAR TRAIN UNIT WITH MOTOR GENERATOR

(75) Inventor: Hirofumi Ota, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 92 days.

(21) Appl. No.: 12/449,058

(22) PCT Filed: Oct. 9, 2008

(86) PCT No.: PCT/JP2008/068347
§ 371 (c)(1),
(2), (4) Date: Jul. 22, 2009

(87) PCT Pub. No.: WO2009/051056
PCT Pub. Date: Apr. 23, 2009

(65) Prior Publication Data
US 2010/0029429 A1    Feb. 4, 2010

(30) Foreign Application Priority Data
Oct. 17, 2007    (JP) .................................. 2007-270366

(51) Int. Cl.
*F16H 3/72*    (2006.01)
(52) U.S. Cl. .......................................... 475/5; 180/65.7
(58) Field of Classification Search .......... 475/5; 477/3; 180/65.7
See application file for complete search history.

(56) References Cited

U.S. PATENT DOCUMENTS

| 7,396,305 B2 * | 7/2008 | Raghavan et al. ................ 475/5 |
| 2006/0276288 A1 | 12/2006 | Iwanaka et al. |

FOREIGN PATENT DOCUMENTS

| JP | A-50-85019 | 7/1975 |
| JP | A-2005-112019 | 4/2005 |
| JP | A-2005-138692 | 6/2005 |
| JP | A-2005-138803 | 6/2005 |
| JP | A-2005-297786 | 10/2005 |
| JP | A-2006-258140 | 9/2006 |
| JP | A-2006-298067 | 11/2006 |
| JP | A-2006-341647 | 12/2006 |
| JP | A-2007-83934 | 4/2007 |

* cited by examiner

*Primary Examiner* — David D Le
*Assistant Examiner* — Derek D Knight
(74) *Attorney, Agent, or Firm* — Oliff & Berridge, PLC

(57) ABSTRACT

A gear train unit with a motor-generator having a first planetary gear mechanism, a second planetary gear mechanism, an input shaft, an output shaft, a first clutch, and a second clutch is disclosed. The first planetary gear mechanism includes a first sun gear, a first ring gear, and a first carrier. The second planetary gear mechanism has a second sun gear, a second ring gear, and a second carrier. The second sun gear is connected to the first sun gear. The input shaft is connected to the second ring gear. The output shaft is connected to both the first ring gear and the second carrier. The first clutch selectively connects and disconnects the first carrier to and from the motor-generator. The second clutch selectively connects and disconnects the first sun gear and the second sun gear to and from the motor-generator.

17 Claims, 6 Drawing Sheets

Nomogram

| Mode | | C1 | C2 |
|---|---|---|---|
| HV | Low Output HV Mode | ◯ | — |
| | High Output HV Mode | — | ◯ |
| TM | T/M Direct Connection Mode | ◯ | ◯ |

◯ Connected
— Disconnected

Nomogram of Gear Train Unit

US 7,972,237 B2

GEAR TRAIN UNIT WITH MOTOR GENERATOR

FIELD OF THE INVENTION

The present invention relates to a gear train unit with a motor-generator arranged in a power transmission path, and, more particularly, to a gear train unit suitable for use in a hybrid vehicle.

BACKGROUND OF THE INVENTION

Hybrid vehicles powered by a plurality of types of drive sources, such as an internal combustion engine and a motor-generator, are now in practical use. Japanese Laid-Open Patent Publication No. 2006-258140 discloses a hybrid vehicle having a gear train unit integrally incorporating motor-generators, which are arranged in a power transmission path between an internal combustion engine and drive wheels.

FIG. 10 shows the configuration of the gear train unit described in the above publication. With reference to the drawing, the gear train unit includes three planetary gear mechanisms P1, P2, P3 and two motor-generators MG1, MG2. Each of the planetary gear mechanisms P1 to P3 includes a sun gear, a ring gear, and a carrier.

In the gear train unit, a first carrier 1c of a first planetary gear mechanism P1 is connected to an input shaft In, which is connected to the engine of the hybrid vehicle, in an integrally rotatable manner. A first motor-generator MG1 is connected to a first sun gear 1s of the first planetary gear mechanism P1 in an integrally rotatable manner. A second motor-generator MG2 is connected to a first ring gear 1r of the first planetary gear mechanism P1 in an integrally rotatable manner.

A second planetary gear mechanism P2 and a third planetary gear mechanism P3 are arranged adjacently at the side opposite from the engine with respect to the second motor-generator MG2. A second sun gear 2s of the second planetary gear mechanism P2 and a third sun gear 3s of the third planetary gear mechanism P3 are connected in an integrally rotatable manner. A second carrier 2c of the second planetary gear mechanism P2 and a third ring gear 3r of the third planetary gear mechanism P3 are connected in an integrally rotatable manner. The second sun gear 2s and the third sun gear 3s, which are connected in an integrally rotatable manner, are connected to the first ring gear 1r in an integrally rotatable manner. The second carrier 2c and the third ring gear 3r, which are connected in an integrally rotatable manner, are connected to an output shaft Out of the gear train unit.

The gear train unit also includes a brake B, which is capable of stopping rotation of the second ring gear 2r, and a clutch C, which selectively connects and disconnects the first carrier 1c to and from the third carrier 3c. By switching the engagement state of the brake B and the clutch C, the power transmission of the gear train unit is switched among three modes.

In the gear train unit with the motor-generators of FIG. 10, skidding, or, in other words, dragging, occurs between the brake B and the second ring gear 2r when the brake B is engaged. This lowers the efficiency of the power transmission. Accordingly, as long as the conventional gear train unit with the motor-generators has the brake B, decrease of the power transmission efficiency caused by skidding cannot be avoided.

Patent Document 1: Japanese Laid-Open Patent Publication No. 2006-258140

SUMMARY OF THE INVENTION

Accordingly, it is an objective of the present invention to provide a gear train unit with a motor-generator capable of inhibiting decrease of power transmission efficiency.

To achieve the foregoing objective and in accordance with one aspect of the present invention, a gear train unit with a motor-generator is provided. The gear train is arranged in a power transmission path and includes a first planetary gear mechanism, a second planetary gear mechanism, an input shaft, an output shaft, a first clutch, and a second clutch. The first planetary gear mechanism has a first sun gear, a first ring gear, and a first carrier. The second planetary gear mechanism has a second sun gear, a second ring gear, and a second carrier. The second sun gear is connected to the first sun gear. The input shaft is connected to the second ring gear. The output shaft is connected to both the first ring gear and the second carrier. The first clutch selectively connects and disconnects the first carrier to and from the motor-generator. The second clutch selectively connects and disconnects the first sun gear and the second sun gear to and from the motor-generator.

DETAILED DESCRIPTION OF THE PREFERRED EMBODIMENTS

A gear train unit with motor-generators according to a first embodiment of the present invention will now be described with reference to FIGS. 1 to 4. The gear train unit of the present embodiment is employed in a hybrid vehicle driven by two types of drive sources, which are an internal combustion engine and motor-generators. The gear train unit is arranged in a power transmission path extending between the engine and drive wheels. Two motor-generators are integrally incorporated in the gear train unit of the present embodiment.

Figures 1, 2:
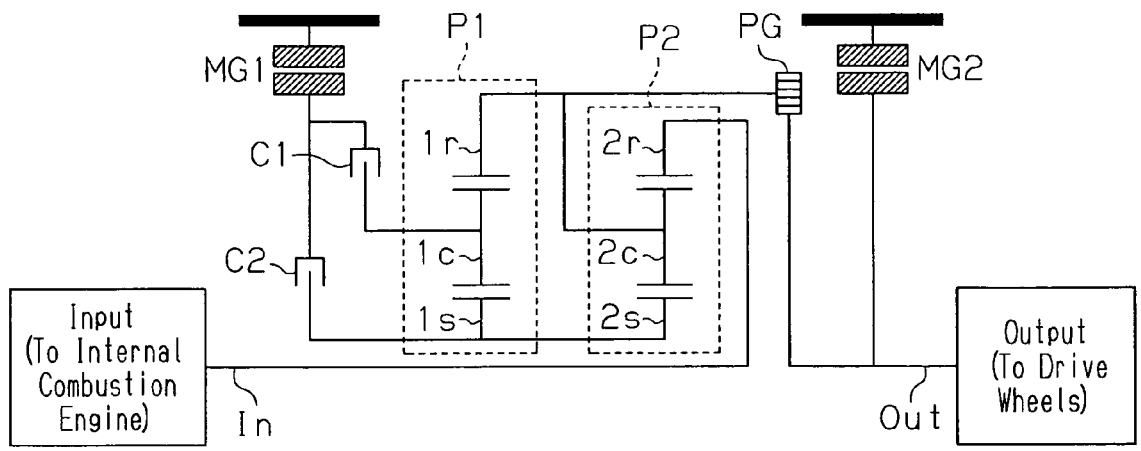
FIG. 1 is a diagram schematically showing the configuration of a gear train unit with motor-generators according to a first embodiment of the present invention.
FIG. 2 is a table showing the operating modes of the gear train unit shown in FIG. 1.

With reference to FIG. 1, in the gear train unit, a first motor-generator MG1, a first planetary gear mechanism P1, a second planetary gear mechanism P2, and a second motor-generator MG2 are arranged in this order from the input side, which is the side corresponding to the engine. The first planetary gear mechanism P1 and the second planetary gear mechanism P2 each include three components, which are a sun gear, a carrier, and a ring gear, and configure a differential gear mechanism.

The first motor-generator MG1 is arranged at the outer periphery of an input shaft In of the gear train unit. The input shaft In is connected to an output shaft of the engine through a torque converter and a clutch. The first motor-generator MG1 is connected to the first planetary gear mechanism P1 through a first clutch C1 and a second clutch C2. More specifically, a rotor of the first motor-generator is connected to a first carrier 1c of the first planetary gear mechanism P1 through the first clutch C1 in an integrally rotatable manner. The rotor of the first motor-generator MG1 is connected to a first sun gear 1s of the first planetary gear mechanism P1 through the second clutch C2 in an integrally rotatable manner. In the gear train unit of the present embodiment, the first clutch C1 and the second clutch C2 are received in an inner peripheral portion of the first motor-generator MG1.

A second planetary gear mechanism P2 is arranged at an output side of the first planetary gear mechanism P1, which is the side corresponding to the drive wheels. A second ring gear 2r of the second planetary gear mechanism P2 is connected to the input shaft In of the gear train unit in an integrally rotatable manner. A second sun gear 2s of the second planetary gear mechanism P2 is connected to the first sun gear 1s of the first gear mechanism P1 in an integrally rotatable manner. A second carrier 2c of the second planetary gear mechanism P2 is connected to an output shaft Out of the gear train unit, which is connected to a first ring gear 1r of the first planetary gear mechanism P1 and the drive wheels, in an integrally rotatable manner.

In the present embodiment, the output shaft Out extends outside the second planetary gear mechanism P2 and is connected to the first ring gear 1r of the first planetary gear mechanism P1. A parking gear PG, which is rotatable integrally with the second carrier 2c and the first ring gear 1r, is arranged in a portion of the output shaft Out extending outside the second planetary gear mechanism P2. Rotation of the parking gear PG can be stopped by a parking rod. In this manner, when the hybrid vehicle is parked, rotation of the output shaft Out is stopped.

The second motor-generator MG2 is arranged at the outer periphery of the output shaft Out at the output side of the second planetary gear mechanism P2, which is the side corresponding to the drive wheels. A rotor of the second motor-generator MG2 is connected to the output shaft Out in an integrally rotatable manner.

As illustrated in FIG. 2, the gear train unit of the present embodiment is switchable among three power transmission modes depending on the state of the first clutch C1 and the state of the second clutch C2. Each one of the power transmission modes of the gear train unit of the present embodiment will be described below.

Figure 3:
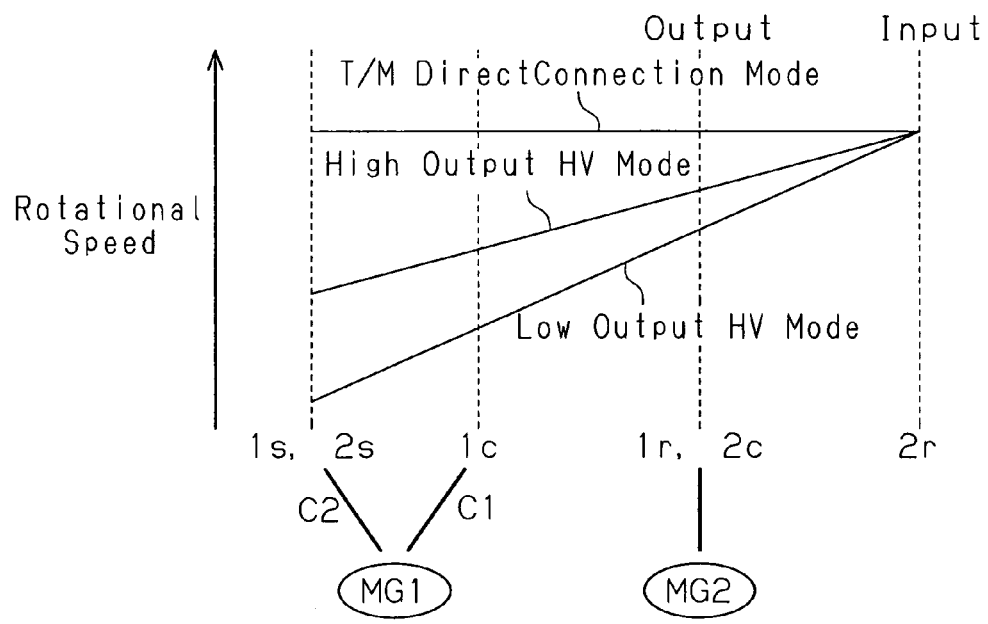
FIG. 3 is a nomogram of the gear train unit shown in FIG. 1.

With reference to FIG. 2, the gear train unit has two power transmission modes, which are, a low output hybrid (HV) mode (a first power transmission mode) and a high output HV mode (a second power transmission-mode), as HV modes, in which the first motor-generator MG1 assists the output of the engine. The gear train unit also has a transmission (T/M) direct connection mode (a third power transmission mode), in which the input shaft In and the output shaft Out are mechanically connected in a direct manner. FIG. 3 is a nomogram representing the three power transmission modes of the gear train unit with the motor-generators of the present embodiment.

In the low output HV mode, the first clutch C1 is engaged and the second clutch C2 is disengaged. This connects the rotor of the first motor-generator MG1 to the first carrier 1c of the first planetary gear mechanism P1 in an integrally rotatable manner. In this state, the drive power of the engine that is input through the input shaft In and the drive power generated by the first motor-generator MG1 are synthesized and output to the output shaft Out of the gear train unit.

In the high output HV mode, the first clutch C1 is disengaged and the second clutch C2 is engaged. This connects the rotor of the first motor-generator MG1 to the first sun gear 1s of the first planetary gear mechanism P1 and to the second sun gear 2s of the second planetary gear mechanism P2 both in an integrally rotatable manner. Also in this state, the drive power of the engine input through the input shaft In and the drive power generated by the first motor-generator MG1 are synthesized and output to the output shaft Out of the gear train unit. However, the torque of the first motor-generator MG1 in this mode is output in an amplified state compared to the low output HV mode. As a result, the high output HV mode provides a higher output than the low output HV mode.

In the T/M direct connection mode, the first clutch C1 and the second clutch C2 are both engaged. This connects the rotor of the first motor-generator MG1 to the first sun gear 1s and the first carrier 1c of the first planetary gear mechanism P1 both in an integrally rotatable manner. When the first sun gear 1s and the first carrier 1c of the first planetary gear mechanism P1 are connected in an integrally rotatable manner, all of the components of the first planetary gear mechanism P1 and the second planetary gear mechanism P2 rotate integrally. As a result, the input shaft In and the output shaft Out of the gear train unit rotate integrally in a mechanical manner.

The gear train unit of the present embodiment is switchable among the three power transmission modes depending on the circumstances. When the vehicle runs in a low to middle speed range, as in the case in which the vehicle travels in a city, operation of the gear train unit is switched between the above-described two HV modes in correspondence with a required output. When the vehicle travels in a high speed range, the T/M direct connection mode is used to allow highly efficient running of the vehicle.

Further, operation of the gear train unit is switched between the two HV modes when the first motor-generator MG 1 regenerates electricity. This allows the first motor-generator MG1 to regenerate the power at a rotation speed that ensures higher efficiency for the power regeneration. Specifically, in the present embodiment, the engagement state of the first clutch C1 and that of the second clutch C2 are selected in such a manner that the first motor-generator MG1 rotates at the rotation speed ensuring the higher power generation efficiency. This allows the first motor-generator MG1 to regenerate the power with improved efficiency.

When the second motor-generator MG2 regenerates power, the first clutch C1 and the second clutch C2 are both disengaged. In this state, all of the components of the first planetary gear mechanism P1 and the second planetary gear mechanism P2 rotate idly, thus maintaining the gear train unit in a state in which no power transmission occurs between the input shaft In and the output shaft Out, that is, a neutral state. This allows all of the power input from the drive wheels to be consumed by the second motor-generator MG2 to regenerate power. This improves the efficiency of the power regeneration by the second motor-generator MG2.

The gear train unit changes the operating conditions of the second motor-generator MG2, which is connected directly to the output shaft Out, in correspondence with the circumstances. This allows the second motor-generator MG2 to effectively perform torque assist or power regeneration. Also, in this manner, the second motor-generator MG2 absorbs change of the drive force caused by switching the first clutch C1 and the second clutch C2 between the engaged state and the disengaged state, which is shift-shock.

The present embodiment has the following advantages.

(1) In the present embodiment, the gear train unit with the motor-generators is configured in the forms described in the following items (a) to (f).

(a) The gear train unit includes the first planetary gear mechanism P1 having the first sun gear 1s, the first ring gear 1r, and the first carrier 1c.

(b) The gear train unit includes the second planetary gear mechanism P2 having the second sun gear 2s, the second ring gear 2r, and the second carrier 2c, like the first planetary gear mechanism P1, with the second sun gear 2s connected to the first sun gear 1s of the first planetary gear mechanism P1.

(c) The input shaft In of the gear train unit is connected to the second ring gear 2r of the second planetary gear mechanism P2.

(d) The output shaft Out of the gear train unit is connected to both the first ring gear 1r of the first planetary gear mechanism P1 and the second carrier 2c of the second planetary gear mechanism P2.

(e) The gear train unit includes the first clutch C1, which selectively connects and disconnects the first carrier 1c of the first planetary gear mechanism P1 to and from the first motor-generator MG1.

(f) The gear train unit includes the second clutch C2, which selectively connects and disconnects the sun gears (the first sun gear 1s and the second sun gear 2s) of the first planetary gear mechanism P1 and the second planetary gear mechanism P2 to and from the first motor-generator MG1.

In the gear train unit of the present embodiment, which is configured as described above, the operation is switched among the three power transmission modes by selectively engaging and disengaging the first and second clutches C1, C2, without employing a brake. This allows more efficient power transmission, without decreasing the power transmission efficiency due to skidding of the brake.

(2) In the gear train unit of the present embodiment, switching of the above-described power transmission modes, which are the low output HV mode, the high output HV mode, and the T/M direct connection mode, is carried out by a comparatively small number of components. This saves the cost for manufacturing the gear train unit.

(3) In the present embodiment, if high output is required when the vehicle travels in a low to middle speed range, that is, when the output shaft Out rotates in a low to middle speed range, the first clutch C1 is disengaged and the second clutch C2 is engaged. When the vehicle runs in a speed range other than the low to middle speed range, the first clutch C1 is engaged and the second clutch C2 is disengaged. As a result, torque assist by the first motor-generator MG1 is carried out efficiently in correspondence with the required torque.

(4) In the present embodiment, when the first motor-generator MG1 regenerates electricity, the operation is switched between the high output HV mode and the low output HV mode in such a manner that the first motor-generator MG1 rotates at the rotation speed ensuring the higher power transmission efficiency. This allows the first motor-generator MG1 to regenerate electricity with improved efficiency.

(5) In the present embodiment, when the vehicle runs in a high speed range, that is, when the output shaft Out rotates in a high speed range, the first clutch C1 and the second clutch C2 are both engaged. This maintains the input shaft In and the output shaft Out of the gear train unit in a state directly and mechanically connected to each other in an integrally rotatable manner. Accordingly, decrease of the power transmission efficiency caused by electricity loss brought about by operation of the first motor/generator MG1 is avoided. This ensures highly efficient traveling of the vehicle.

(6) In the present embodiment, the first clutch C1 and the second clutch C2 are both arranged in the inner peripheral portion of the first motor-generator MG1. This prevents the entire length of the gear train unit, which is the length from the input shaft In to the output shaft Out in the axial direction of the gear train unit, from increasing. Further, only the first clutch C1, the second clutch C2, and the input shaft In are arranged in the inner peripheral portion of the first motor-generator MG1, but the planetary gear mechanisms P1, P2 are not. This inhibits increase of the outer diameter of the first motor-generator MG1, or, in other words, the outer diameter of the gear train unit. As a result, the gear train unit is easily mounted in either a front-engine rear-drive vehicle, in which a gear train unit with a smaller outer diameter is particularly needed or a front-engine front-drive vehicle, which limits the entire length of the gear train unit.

(7) In the present embodiment, the second motor-generator MG2, which is connected to the output shaft Out, is employed in addition to the first motor-generator MG1. By using the two motor-generators, the torque assist and the electricity regeneration are performed more effectively. Also, the second motor-generator MG2 absorbs the change of the drive force caused by switching the engagement states of the first clutch C1 and the second clutch C2, which is the shift shock.

(8) In the present embodiment, the second motor-generator MG2 is arranged at the outer periphery of the portion of the output shaft Out corresponding to the output side of the second planetary gear mechanism P2. Accordingly, only the output shaft Out is located in the inner periphery of the second motor-generator MG2. This decreases the outer diameter of the second motor-generator MG2, thus reducing the outer diameter of the gear train unit.

(9) When the second motor-generator MG2 regenerates electricity, the first clutch C1 and the second clutch C2 are both disengaged in order to cause every component of the first planetary gear mechanism P1 and the second planetary gear mechanism P2 to rotate idly. This allows all of the power input from the drive wheels to be consumed by the electricity regeneration of the second motor-generator MG2. The electricity regeneration is thus carried out efficiently.

(10) The configuration of the gear train unit is divided into the portion corresponding to the second motor-generator MG2, the portion corresponding to the planetary gear mechanisms P1, P2, and the portion corresponding to the first motor-generator MG1 in this order from the output side. Accordingly, the gear train unit is manufactured by assembling the three portions sequentially. The gear train unit is thus assembled comparatively easily.

(11) In the present embodiment, the output shaft Out extends outside the second planetary gear mechanism P2 and is connected to the first ring gear 1r of the first planetary gear mechanism P1. The parking gear PG is arranged in the portion of the output shaft Out that extends outside the second planetary gear mechanism P2. Since the parking gear PG must reliably fix the output shaft Out with respect to great drive force, the parking gear PG must have a large outer diameter to a certain extent. If the output shaft Out of the gear train unit is connected to a sun gear of a planetary gear mechanism, a sufficient outer diameter cannot be ensured in a parking gear. In this case, the parking gear must be provided as a separate component. However, in the present embodiment, the parking gear PG is arranged in the portion of the output shaft Out that extends outside the second planetary gear mechanism P2. As a result, the parking gear PG with a large diameter is easily installed.

Figure 4:
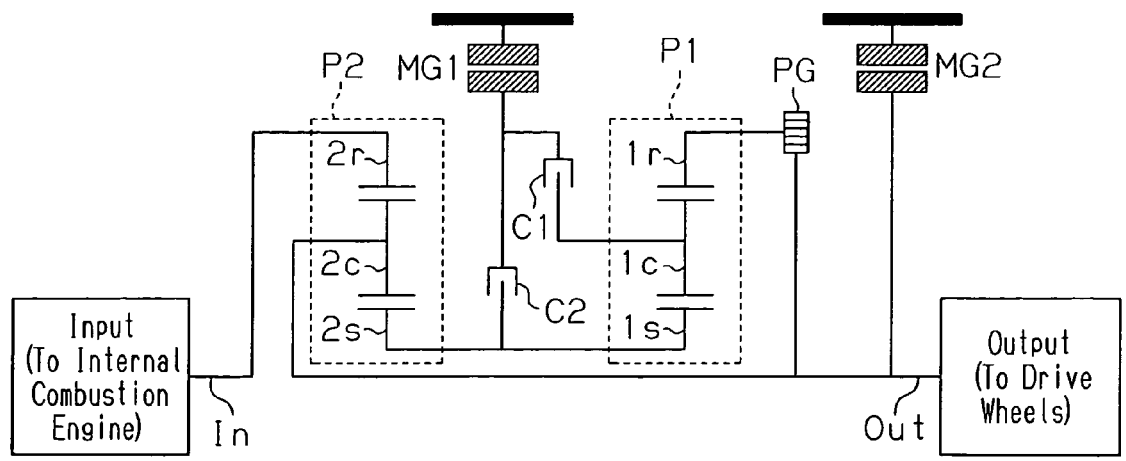
FIG. 4 is a diagram schematically showing the overall configuration of a modification of the gear train unit according to the first embodiment shown in FIG. 1.

The gear train unit with the motor-generators of the present embodiment may be configured as illustrated in FIG. 4. In the gear train unit illustrated in FIG. 1, the first motor-generator MG1, the first planetary gear mechanism P1, the second planetary gear mechanism P2, and the second motor-generator MG2 are arranged in this order from the input side (the side corresponding to the internal combustion engine). In the gear train unit illustrated in FIG. 4, the second planetary gear mechanism P2, the first motor-generator MG1, the first planetary gear mechanism P1, and the second motor-generator MG2 are arranged in this order from the input side (the side corresponding to the engine). The components of the gear train unit of FIG. 4 are connected in the same manner as the components of the gear train unit of FIG. 1. That is, since the components are connected in the same manners as the first embodiment, the same advantages as the advantages of the first embodiment are obtained even when the arrangement orders of the units is modified. In other words, the gear train unit of FIG. 4 has the same advantages as the advantages (1) to (11).

A gear train unit with motor-generators according to a second embodiment of the present invention will hereafter be explained with reference to FIG. 5. In the following description, same or like reference numerals are given to components of the second, third, and fourth embodiments that are the same as or like corresponding components of the first embodiment. Detailed description of these components will be omitted.

In the first embodiment, the axial length of the gear train unit is reduced by arranging the first clutch C1 and the second clutch C2 in the inner peripheral portion of the first motor-generator MG1. However, such limitation to the axial length of the gear train unit is not as needed in a front-engine rear-drive vehicle as in an front-engine front-drive vehicle, but reduction of the radial dimension of the gear train unit, rather than that of the axial length, is strongly demanded in the front-engine rear-drive vehicle. To meet the demand, in the second embodiment, the radial dimension of the gear train unit is further reduced while maintaining functions equivalent to those of the gear train unit of the present embodiment, by configuring the gear train unit as described below.

Figure 5:
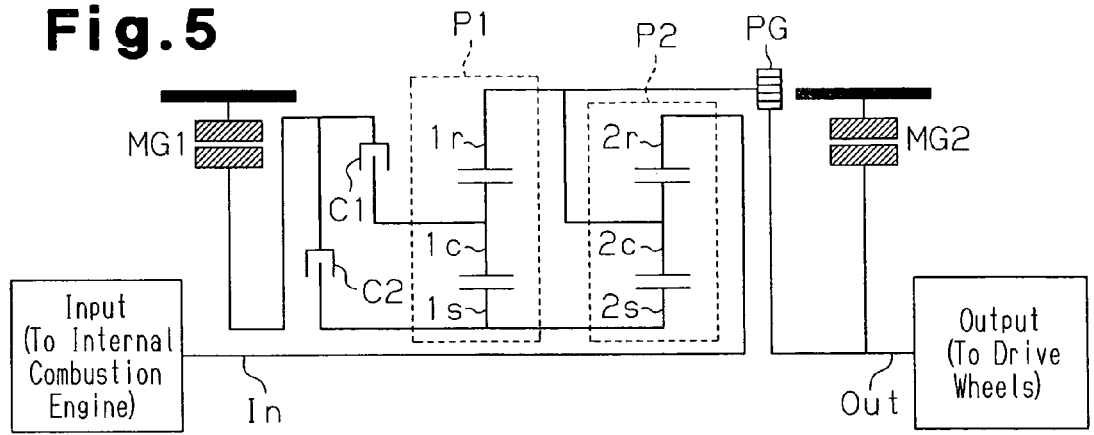
FIG. 5 is a diagram schematically showing the configuration of a gear train unit with motor-generators according to a second embodiment of the present invention.

As illustrated in FIG. 5, the gear train unit of the present embodiment has an input shaft In, an output shaft Out, two motor-generators MG1, MG2, two planetary gear mechanisms P1, P2, and two clutches C1, C2, like the first embodiment. The components are connected in the same manner as those of the first embodiment. However, in the gear train unit of the second embodiment, the first clutch C1 and the second clutch C2 are arranged at positions different from the positions of the first embodiment. Specifically, in the gear train unit of the present embodiment, the first clutch C1 and the second clutch C2 are located between the first motor-generator MG1 and the first planetary gear mechanism P1. In other words, in the present embodiment, the first motor-generator MG1, a clutch portion formed by the first clutch C1 and the second clutch C2, and the first planetary gear mechanism P1 are arranged in this order from the input side of the gear train unit.

The functions of the gear train unit of the present embodiment are the same as those of the first embodiment and the present embodiment basically has the same advantages as those of the first embodiment. In other words, also in the gear train unit with the motor-generators of the present embodiment, advantages that are the same as or similar to the items (1) to (5) and (7) to (11) are obtained. Further, in addition to these advantages, the outer diameter of the first motor-generator MG1 and, consequently, the outer diameter of the gear train unit are further decreased by arranging only the input shaft In in the inner peripheral portion of the first motor-generator MG1. As a result, the gear train unit of the present embodiment has a further reduced outer diameter and is preferable for installation in the front-engine rear-drive vehicle.

As in the case of the first embodiment, the order of arrangement of the components may be changed also in the gear train unit of the present embodiment. Specifically, the arrangement order may be changed in such a manner that the second planetary gear mechanism P2, the first motor-generator MG1, the first planetary gear mechanism P1, and the second motor-generator MG2 are arranged in this order from the input side (the side corresponding to the internal combustion engine). Also in this case, as long as the components are connected in the same manner as the second embodiment, the same advantages as those of the second embodiment are obtained.

A gear train unit with motor-generators according to a third embodiment of the present invention will now be described with reference to FIG. 6(a). The gear train unit of the present embodiment is configured by adding an underdrive mechanism, which amplifies output, to the gear train unit of the first embodiment.

Figure 6A:
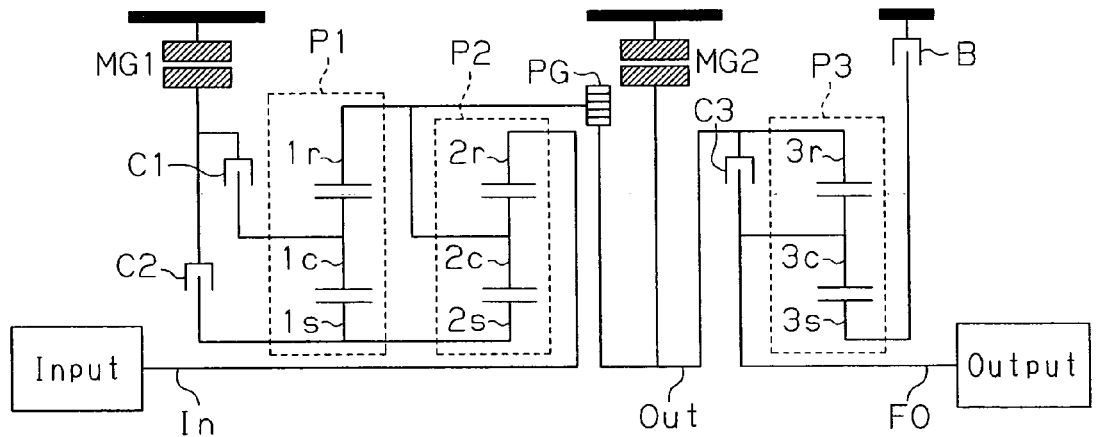
FIG. 6(a) is a diagram schematically showing the configuration of a gear train unit with motor-generators according to a third embodiment of the present invention.

With reference to FIG. 6(a), the underdrive mechanism, which is the additional component of the present embodiment, is located at the output side of the second motor-generator MG2. The underdrive mechanism includes a third planetary gear mechanism P3, a third clutch C3, and a brake B.

In the present embodiment, the output shaft Out of the gear train unit is connected to a third ring gear 3r of the third planetary gear mechanism P3 in an integrally rotatable manner. A third carrier 3c of the third planetary gear mechanism P3 is connected to a final output shaft FO, which is the final output shaft of the gear train unit of the present embodiment, in an integrally rotatable manner. Further, the gear train unit of the present embodiment includes the third clutch C3, which selectively connects and disconnects the third ring gear 3r to and from the third carrier 3c, and the brake B, which selectively stops rotation of a third sun gear 3s of the third planetary gear mechanism P3.

In the gear train unit with the motor-generators of the present embodiment, when the third clutch C3 connects the third ring gear 3r to the third carrier 3c in an integrally rotatable manner and the brake B is disengaged, the components of the third planetary gear mechanism P3 rotate integrally. This rotates the final output shaft FO and the output shaft Out integrally. In other words, the output of the output shaft Out is output directly through the final output shaft FO.

When the third clutch C3 is disengaged so as to allow the third ring gear 3r and the third carrier 3c to rotate separately and rotation of the third sun gear 3s is stopped by means of the brake B, rotation of the output shaft Out is reduced and transmitted to the final output shaft FO. As a result, the torque of the output shaft Out is amplified and output from the final output shaft FO. Accordingly, the output of the gear train unit at this stage is amplified.

The gear train unit with the motor-generators of the present embodiment has the following advantage in addition to the advantages of the first embodiment. Specifically, in the present embodiment, since the output is amplified by the underdrive mechanism, further increase of the output is enabled. Also, if the output is equal to that of the first embodiment, the first motor-generator MG1 may be further reduced in size. The underdrive mechanism used in the gear train unit of the present embodiment may be employed in the gear train unit with the motor-generators of the second embodiment.

Figure 6B:
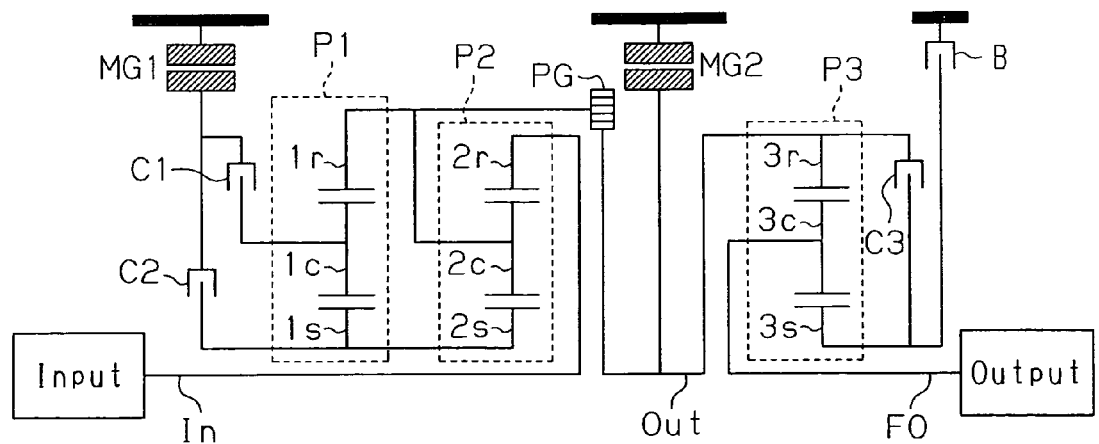
FIG. 6(b) is a diagram schematically showing the configuration of a modification of the gear train unit with motor-generators according to the third embodiment.

The underdrive mechanism of the gear train unit with the motor-generators according to the present embodiment may be configured as illustrated in FIG. 6B. In the gear train unit with the motor-generators illustrated in FIG. 6B, the underdrive mechanism is arranged at the output side of the second motor-generator MG2. Like the underdrive mechanism of the previous embodiment, the underdrive mechanism of FIG. 6B has a third planetary gear mechanism P3, a third clutch C3, and a brake B.

In the gear train unit of FIG. 6B, the output shaft Out is connected to the third ring gear 3r of the third planetary gear mechanism P3 in an integrally rotatable manner. The third carrier 3c of the third planetary gear mechanism P3 is connected to the final output shaft FO of the gear train unit of the present embodiment. Further, like the above described embodiments, the brake B, which selectively stops rotation of the third sun gear 3s of the third planetary gear mechanism P3, is employed.

However, the third clutch C3 of the gear train unit of FIG. 6B selectively connects and disconnects the third sun gear 3s to and from the third ring gear 3r of the third planetary gear mechanism P3. Also in this gear train unit, the underdrive mechanism functions substantially in the same manner as that of the above described embodiments.

Figure 7A:
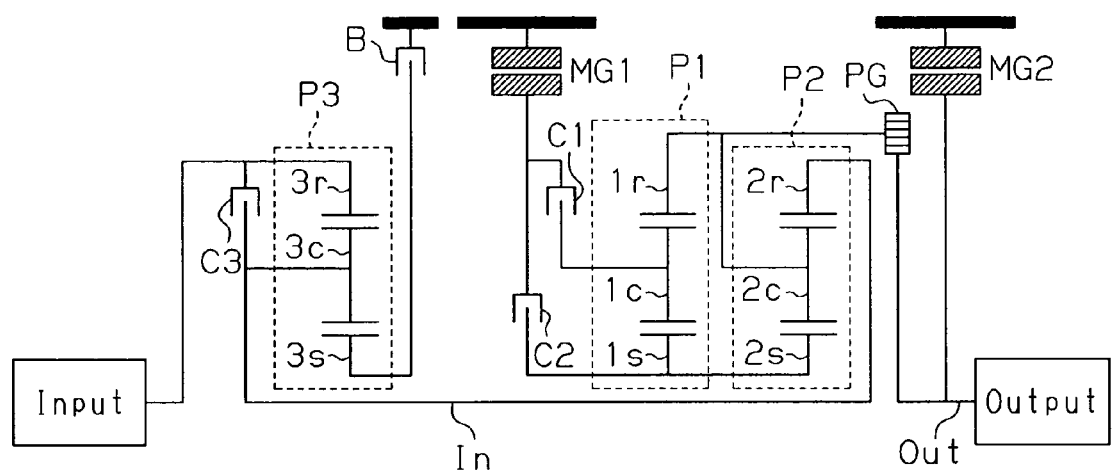
FIG. 7(a) is a diagram schematically showing the configuration of another modification of the gear train unit with motor-generators according to the third embodiment.

The underdrive mechanism may be arranged at the input side of the gear train unit, which is the side corresponding to the engine. In the gear train unit illustrated in FIG. 7(a), the third planetary gear mechanism P3, the third clutch C3, and the brake B are arranged at the input side of the first motor-generator MG1. Specifically, the drive power of the engine is input to the third ring gear 3r of the third planetary gear mechanism P3. The input shaft In of the gear train unit of the first embodiment is connected to the third carrier 3c of the third planetary gear mechanism P3 in an integrally rotatable manner. The third clutch C3 is arranged in such a manner as to selectively connect and disconnect the third ring gear 3r to and from the third carrier 3c. The brake B is arranged in such a manner as to selectively stop rotation of the third sun gear 3s of the third planetary gear mechanism P3. Even when the underdrive mechanism is arranged at the input side of the gear train unit, as has been described, the same advantages as those of the case in which the underdrive mechanism is located at the output side are obtained.

Figure 7B:
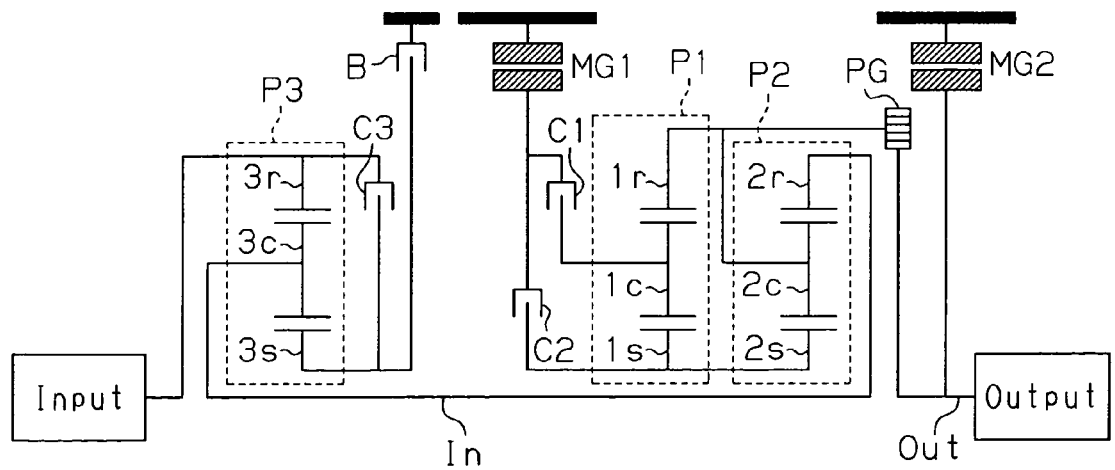
FIG. 7(b) is a diagram schematically showing the configuration of a modification of the gear train unit with motor-generators shown in FIG. 7(a)

The structure of the underdrive mechanism arranged at the input side of the gear train unit may be modified as illustrated in FIG. 7(b). The underdrive mechanism of the gear train unit illustrated in FIG. 7(b) is identical to that of the gear train unit illustrated in FIG. 7(a), except that the third clutch C3 of the under drive mechanism of FIG. 7(b) is arranged in such a manner as to selectively connect and disconnect the third sun gear 3s to and from the third ring gear 3r of the third planetary gear mechanism P3. The advantages of the gear train unit having the underdrive mechanism of FIG. 7(b) are basically the same as those of the gear train unit of FIG. 7(a).

A gear train unit with motor-generators according to a fourth embodiment of the present invention will hereafter be explained with reference to FIG. 8(a). The gear train unit of the present embodiment is configured by adding an overdrive mechanism, which increases output rotational speed, to the gear train unit of the first embodiment.

Figure 8A:
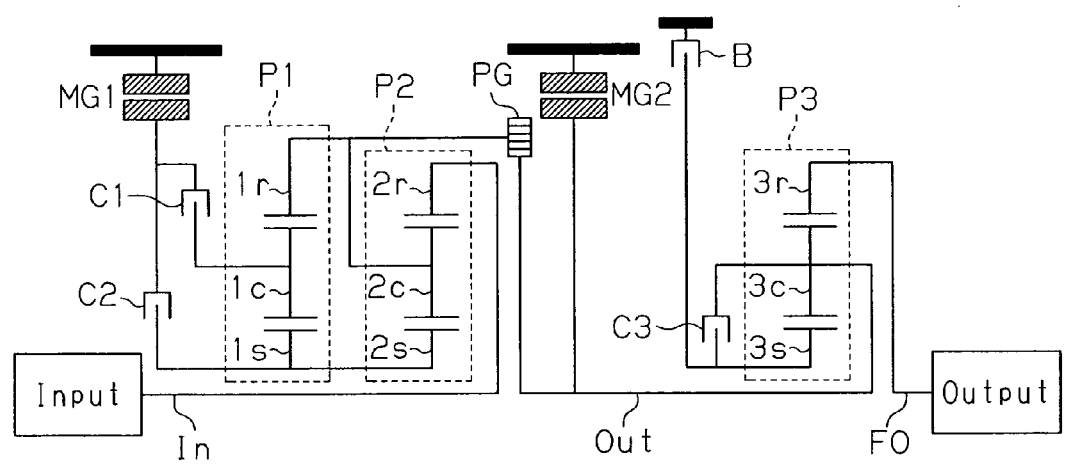
FIG. 8(a) is a diagram schematically showing the configuration of a gear train unit with motor-generators according to a fourth embodiment of the present invention.

As illustrated in FIG. 8(a), the overdrive mechanism, which is the additional component of the present embodiment, is arranged at the output side of the second motor-generator MG2. The overdrive mechanism includes the third planetary gear mechanism P3, the third clutch C3, and the brake B, like the underdrive mechanism of the third embodiment.

In the gear train unit of the present embodiment, the output shaft Out of the gear train unit of the first embodiment is connected to the third carrier 3c of the third planetary gear mechanism P3 in an integrally rotatable manner. The third ring gear 3r of the third planetary gear mechanism P3 is connected to the final output shaft FO of the gear train unit of the present embodiment in an integrally rotatable manner. The gear train unit of the present embodiment also includes the third clutch C3, which selectively connects and disconnects the third sun gear 3s to and from the third carrier 3c of the third planetary gear mechanism P3, and the brake B, which selectively stops rotation of the third sun gear 3s.

When the third clutch C3 connects the third sun gear 3s to the third carrier 3c and the brake B is disengaged in the gear train unit with the motor-generators of the present embodiment, which is configured as described above, all of the components of the third planetary gear mechanism P3 rotate integrally. This causes integral rotation of the final output shaft FO and the output shaft Out. That is, the output of the output shaft Out is output to the final output shaft FO.

When the third sun gear 3s and the third carrier 3c are allowed to rotate separately by disengaging the third clutch C3 and rotation of the third sun gear 3s is stopped by means of the brake B, rotation of the output shaft Out is increased and transmitted to the final output shaft FO. In other words, the rotational speed of the final output shaft FO exceeds the rotational speed of the output shaft Out.

The gear train unit with the motor-generators of the present embodiment, which has been described, has the following advantage in addition to the advantages of the first embodiment. Specifically, in the present embodiment, the output rotational speed is increased by the overdrive mechanism, which is the additional component. This further raises the vehicle speed when operated in the T/M direct connection mode. The overdrive mechanism employed in the gear train unit of the present embodiment may be employed in the gear train unit with the motor-generators of the second embodiment.

Figure 8B:
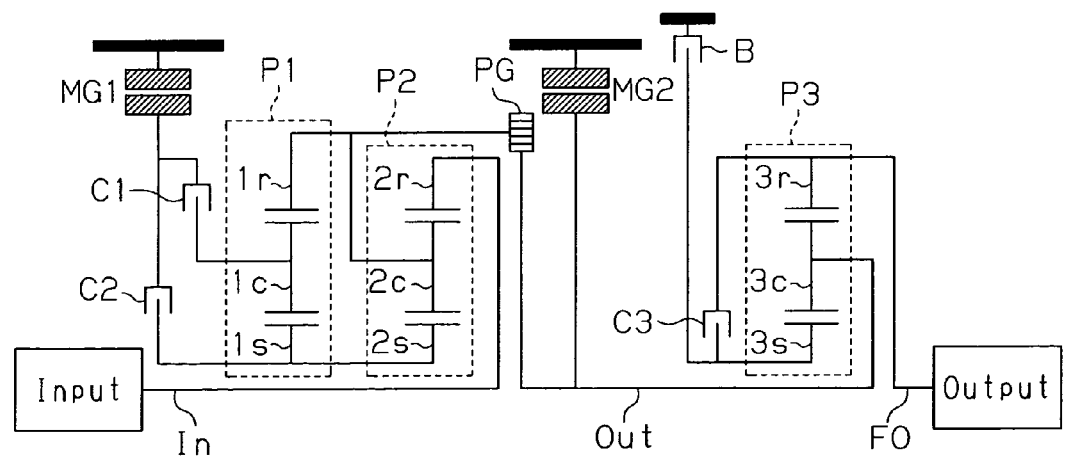
FIG. 8(b) is a diagram schematically showing the configuration of a modification of the gear train unit with motor-generators according to the fourth embodiment.

The overdrive mechanism of the gear train unit with the motor-generators of the present embodiment may be configured as illustrated in FIG. 8(b). Also in the gear train unit with the motor-generators illustrated in FIG. 8(b), the overdrive mechanism is arranged at the output side of the second motor-generator MG2. Like the overdrive mechanism of the above described embodiments, the overdrive mechanism has the third planetary gear mechanism P3, the third clutch C3, and the brake B.

In the gear train unit of FIG. 8(b), the output shaft Out is connected to the third carrier 3c of the third planetary gear mechanism P3 in an integrally rotatable manner. The third ring gear 3r of the third planetary gear mechanism P3 is connected to the final output shaft FO of the gear train unit of the present embodiment in an integrally rotatable manner. Further, as in the above described embodiments, the gear train unit has the brake B, which selectively stops rotation of the third sun gear 3s of the third planetary gear mechanism P3.

However, in the gear train unit illustrated in FIG. 8(b), the third clutch C3 selectively connects and disconnects the third sun gear 3s to and from the third ring gear 3r of the third planetary gear mechanism P3. Also in the gear train unit configured as has been described, the underdrive mechanism functions substantially in the same manner as that of the above described embodiments.

Figure 9A:
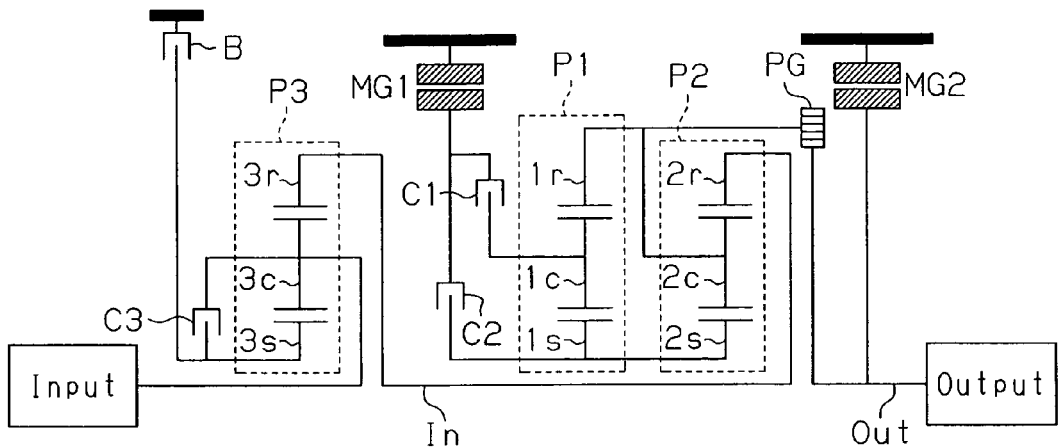
FIG. 9(a) is a diagram schematically showing the overall configuration of another modification of the gear train unit with motor-generators according to the fourth embodiment.

Alternatively, the overdrive mechanism may be arranged at the input side of the gear train unit, which is the side corresponding to the engine. In the gear train unit illustrated in FIG. 9(a), the third planetary gear mechanism P3, the third clutch C3, and the brake B are arranged at a position closer to the input side than the first motor-generator MG1. The drive power of the engine is input to the third carrier 3c of the third planetary gear mechanism P3. The input shaft In of the gear train unit of the first embodiment is connected to the third ring gear 3r of the third planetary gear mechanism P3 in an integrally rotatable manner. The third clutch C3 is arranged in such a manner as to selectively connect and disconnect the third sun gear 3s to and from the third carrier 3c of the third planetary gear mechanism P3. The brake B is arranged in such a manner as to selectively stop rotation of the third sun gear 3s. Also in this case, in which the overdrive mechanism is located at the input side of the gear train unit, the same advantages as those of the case in which the overdrive mechanism is arranged at the output side are obtained.

Figure 9B:
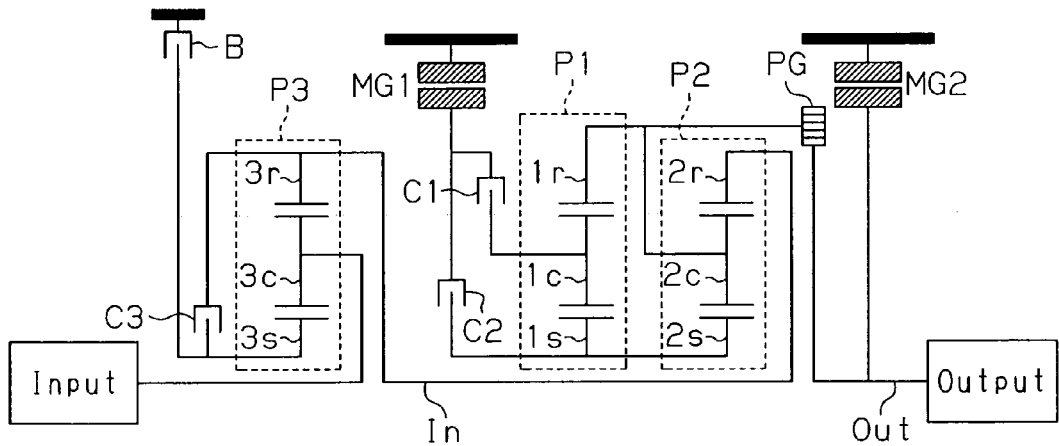
FIG. 9(b) is a diagram schematically showing the configuration of a modification of the gear train unit with motor-generators shown in FIG. 8(a)
Figure 10:
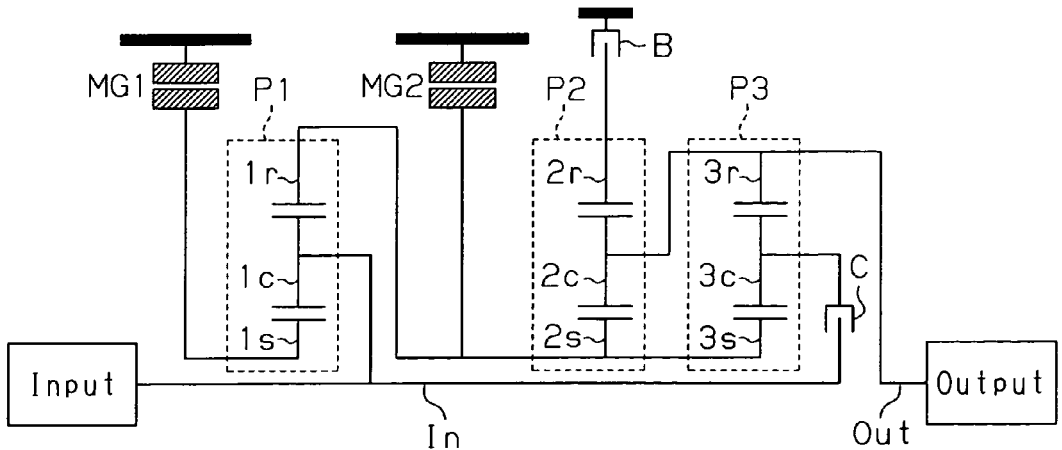
FIG. 10 is a diagram schematically showing the overall configuration of a conventional gear train unit with motor-generators.

The configuration of the overdrive mechanism arranged at the input side of the gear train unit may be modified as illustrated in FIG. 9(b). The overdrive mechanism of the gear train unit illustrated in FIG. 9(b) is configured identically to that of the gear train unit of FIG. 9(a), except that the third clutch C3 is arranged in such a manner as to selectively connect and disconnect the third sun gear 3s to and from the third ring gear 3r of the third planetary gear mechanism P3. The advantages of the gear train unit having the overdrive mechanism of FIG. 9(b) are basically the same as those of the gear train unit of FIG. 9(a).

The gear train units with the motor-generators, which have been explained above, may be embodied in the following modified forms.

In each of the gear train units of the third embodiment and its modification, the second planetary gear mechanism P2, the first motor-generator MG1, the first planetary gear mechanism P1, and the second motor-generator MG2 may be arranged in this order from the input side of the gear train unit. In each of the gear train units of the fourth embodiment and its modification, the second planetary gear mechanism P2, the first motor-generator MG1, the first planetary gear mechanism P1, and the second motor-generator MG2 may be arranged in this order from the input side of the gear train unit.

In each of the illustrated embodiments, control modes related to switching the power transmission modes of the gear train unit may be modified as needed in correspondence with the circumstances in which the power transmission system using the gear train unit is operated.

In the gear train unit with the motor-generators of each of the illustrated embodiments, the parking gear PG is arranged in a portion of the output shaft Out extending outside the second planetary gear mechanism P2. However, the location of the parking gear PG may be changed as needed. Further, when the parking gear PG is unnecessary, as in a case in which the gear train unit is employed in a vehicle other than the hybrid vehicle, the parking gear PG may be omitted.

In each of the illustrated embodiments, the second motor-generator MG2 is located at the outer periphery of the output shaft Out at the output side of the second planetary gear mechanism P2. However, the position of the second motor-generator MG2 may be changed as needed. For example, when it is necessary to further reduce the entire length of the gear train unit, the second motor-generator MG2 may be arranged in the portion of the output shaft Out extending outside the second planetary gear mechanism P2 to decrease the entire length of the gear train unit. That is, the second motor-generator MG2 may be located at any suitable position as long as the second motor-generator MG2 is connected to the output shaft Out.

The gear train unit with the motor-generators of each of the illustrated embodiments has the first and second planetary gear mechanisms P1, P2, the first and second motor-generators MG1, MG2, and the first and second clutches C1, C2. The positions of these components may be modified as needed as long as the components are connected substantially in the same manner as those of the illustrated embodiments. For example, if it is acceptable to increase the outer diameter of the gear train unit, the first motor-generator MG1 may be arranged at the outer periphery of the first planetary gear mechanism P1 or the second motor-generator MG2 may be located at the outer periphery of the second planetary gear mechanism P2.

Although the gear train unit with the motor-generators of each of the illustrated embodiments has the second motor-generator MG2, which is connected to the output shaft Out, the second motor-generator MG2 may be omitted. Even without the second motor-generator MG2, switching among the three types of power transmission modes can be performed in the same manner as that of the case having the second motor-generator MG2, by switching the first clutch C1 and the second clutch C2 between the disengaged state and the engaged state.

In each of the illustrated embodiments, the gear train unit with the motor-generators according to the present invention is used in a power transmission system of a hybrid vehicle. However, the gear train unit with the motor-generators of the invention may be used for other purposes.

The invention claimed is:

1. A gear train unit with a motor-generator, the gear train unit being arranged in a power transmission path, the gear train unit comprising:
   a first planetary gear mechanism having a first sun gear, a first ring gear, and a first carrier;
   a second planetary gear mechanism having a second sun gear, a second ring gear, and a second carrier, the second sun gear being connected to the first sun gear;
   an input shaft directly connected to the second ring gear;
   an output shaft connected to both the first ring gear and the second carrier;
   a first clutch that selectively connects and disconnects the first carrier to and from the motor-generator; and
   a second clutch that selectively connects and disconnects the first sun gear and the second sun gear to and from the motor-generator.

2. The gear train unit according to claim 1, wherein power transmission modes of the gear train unit include a first power transmission mode, in which the first clutch is disengaged and the second clutch is engaged, and a second power transmission mode, in which the first clutch is engaged and the second clutch is disengaged.

3. The gear train unit according to claim 1, claim 2, wherein the power transmission modes of the gear train unit further include a third power transmission mode, in which the first clutch and the second clutch are both engaged.

4. The gear train unit according to claim 1, wherein the first clutch and the second clutch are arranged inward in a radial direction of the motor-generator.

5. The gear train unit according to claim 1, wherein the first clutch and the second clutch are arranged between the motor-generator and the first planetary gear mechanism.

6. The gear train unit according to claim 1, wherein the motor-generator is a first motor-generator, and wherein the gear train unit further includes a second motor-generator connected to the output shaft.

7. The gear train unit according to claim 6, wherein the second motor-generator is arranged in an outer periphery of the output shaft at an output side of the second planetary gear mechanism.

8. The gear train unit according to claim 6, wherein, when the second motor-generator regenerates electricity, the first clutch and the second clutch are both disengaged.

9. The gear train unit according to claim 1, further comprising a final output shaft arranged at a position closer to an output side than the output shaft, a third planetary gear mechanism, a third clutch, and a brake, wherein the third planetary gear mechanism includes:
a third sun gear;
a third ring gear connected to the output shaft; and
a third carrier connected to the final output shaft,
wherein the third clutch selectively connects and disconnects the third ring gear to and from the third carrier, and
wherein the brake selectively stops rotation of the third sun gear.

10. The gear train unit according to claim 1, further comprising a final output shaft arranged at a position closer to an output side than the output shaft, a third planetary gear mechanism, a third clutch, and a brake, wherein the third planetary gear mechanism includes:
a third sun gear;
a third ring gear connected to the output shaft; and
a third carrier being connected to the final output shaft,
wherein the third clutch selectively connects and disconnects the third sun gear to and from the third ring gear, and
wherein the brake selectively stops rotation of the third sun gear.

11. The gear train unit according to claim 1, further comprising a third planetary gear mechanism, a brake, and a third clutch, wherein the third planetary gear mechanism includes:
a third sun gear;
a third ring gear; and
a third carrier to which drive power is input from the third ring gear,
wherein the third clutch selectively connects and disconnects the third ring gear to and from the third carrier, and
wherein the brake selectively stops rotation of the third sun gear.

12. The gear train unit according to claim 1, further comprising a third planetary gear mechanism, a brake, and a third clutch, wherein the third planetary gear mechanism includes:
a third sun gear;
a third ring gear; and
a third carrier to which drive power is input from the third ring gear,
wherein the third clutch selectively connects and disconnects the third sun gear to and from the third ring gear, and
wherein the brake selectively stops rotation of the third sun gear.

13. The gear train unit according to claim 1, further comprising a final output shaft arranged at a position closer to the to an output side than the output shaft, a third planetary gear mechanism, a third clutch, and a brake, wherein the third planetary gear mechanism includes:
a third sun gear;
a third ring gear connected to the final output shaft; and
a third carrier connected to the output shaft,
wherein the third clutch selectively connects and disconnects the third sun gear to and from the third carrier, and
wherein the brake selectively stops rotation of the third sun gear.

14. The gear train unit according to claim 1, further comprising a final output shaft arranged at a position closer to an output side than the output shaft, a third planetary gear mechanism, a third clutch, and a brake, wherein the third planetary gear mechanism includes:
a third sun gear;
a third carrier connected to the output shaft; and
a third ring gear connected to the final output shaft,
wherein the third clutch selectively connects and disconnects the third sun gear to and from the third ring gear, and
wherein the brake selectively stops rotation of the third sun gear.

15. The gear train unit according to claim 1, further comprising a third planetary gear mechanism, a brake, and a third clutch, wherein the third planetary gear mechanism includes:
a third sun gear;
a third ring gear connected to the input shaft; and
a third carrier to which drive power is input from the third ring gear,
wherein the third clutch selectively connects and disconnects the third sun gear to and from the third carrier, and
wherein the brake selectively stops rotation of the third sun gear.

16. The gear train unit according to claim 1, further comprising a third planetary gear mechanism, a brake, and a third clutch, wherein the third planetary gear mechanism includes:
a third sun gear;
a third ring gear connected to the input shaft; and
a third carrier to which drive power is input from the third ring gear,
wherein the third clutch selectively connects and disconnects the third sun gear to and from the third ring gear, and
wherein the brake selectively stops rotation of the third sun gear.

17. The gear train unit according to claim 1, wherein the gear train unit is arranged in a power transmission path extending between an internal combustion engine and drive wheels of a hybrid vehicle.

* * * * *